United States Patent [19]

Kubota et al.

[11] Patent Number: 4,717,207
[45] Date of Patent: Jan. 5, 1988

[54] BOOSTER UNIT FOR MOVING A VEHICLE ON A SLOPE AND METHOD OF CONTROLLING THE SAME

[75] Inventors: Hitoshi Kubota, Minamiashigara; Sachio Ohno, Zama, both of Japan

[73] Assignee: Nissan Motor Co., Ltd., Yokohama, Japan

[21] Appl. No.: 869,693

[22] Filed: Jun. 2, 1986

[30] Foreign Application Priority Data

Jun. 3, 1985 [JP] Japan .................. 60-120319
Jun. 21, 1985 [JP] Japan .................. 60-135637

[51] Int. Cl.⁴ .................. B60R 25/08; B60T 17/16
[52] U.S. Cl. .................. 303/3; 180/282; 180/290; 188/1.11; 188/181 T; 188/353; 188/358; 192/3 H; 192/3 TR; 303/20; 303/68; 303/100; 303/112; 303/89; 303/24 F; 364/426
[58] Field of Search .................. 180/282, 290; 280/707; 192/3 H, 3 TR, 0.094, 13 A, 4 A, 9; 303/20, 6, 89, 112, 2-3, 100, 18, 68-69; 188/353, 265, 1.11, 181 T, 355-360; 364/424, 426

[56] References Cited

U.S. PATENT DOCUMENTS

| | | | |
|---|---|---|---|
| 3,694,039 | 9/1972 | Kawabe et al. | 192/3 H X |
| 4,446,950 | 5/1984 | Wise et al. | 192/3 TR |
| 4,453,778 | 6/1984 | Smith et al. | 180/282 X |
| 4,610,483 | 9/1986 | Matsumuto et al. | 180/282 X |
| 4,618,040 | 10/1986 | Honma et al. | 192/0.094 X |
| 4,629,043 | 12/1986 | Matsuo et al. | 192/3 TR X |
| 4,630,706 | 12/1986 | Takayama et al. | 180/282 X |

FOREIGN PATENT DOCUMENTS

58-75162  5/1983  Japan .

Primary Examiner—Douglas C. Butler
Attorney, Agent, or Firm—Schwartz, Jeffery, Schwaab, Mack, Blumenthal & Evans

[57] ABSTRACT

A booster unit for moving a vehicle on a slope and having a booster and a master cylinder coupled to the booster, comprising a brake fluid pressure holding valve having an actuator and provided at a brake fluid pressure piping system for either maintaining or releasing the brake fluid pressure in accordance with the conditions of the vehicle on a slope, a plurality of sensors for detecting the vehicle conditions and a control unit including a microprocessor having a CPU, a RAM, and a ROM so as to receive detected signals from the sensors and to calculate and produce control signals to the actuator of the brake fluid pressure holding valve in accordance with the conditions of the vehicle on a slope, and a method of controlling the booster unit. With this construction, a smooth moving of the vehicle can be realized on a slope.

18 Claims, 11 Drawing Figures

BOOSTER UNIT FOR MOVING A VEHICLE ON A SLOPE AND METHOD OF CONTROLLING THE SAME

BACKGROUND OF THE INVENTION

Field of the Invention

The present invention relates to a booster unit for moving a vehicle on a slope and a method of controlling the booster unit, more particularly to a booster unit capable of easily moving a vehicle on a slope by a suitable release timing control for brake fluid pressure when moving the vehicle on the slope and a method of controlling the same.

Conventionally, booster units for moving vehicles on a slope are known, one of which is for example disclosed in Japanese Patent Disclosure No. 75162/1983.

The booster unit according to the prior art comprises an accelerator switch for detecting acceleration operation for the start of a vehicle, a vehicle tilt sensor for detecting the tilt of the vehicle in the direction of moving and an engine speed sensor, whereby an accelerator is operated when actual vehicle tilt angle is below a predetermined tilt angle value during running on a generally flat road, with a brake lock released. On the other hand, when the vehicle tilt angle becomes above the predetermined value, the release of the brake lock is delayed until the engine speed reaches a predetermined value.

In the booster unit according to the prior art, however, the release timing is controlled in accordance with the engine speed regardless of the clutch conditions. As a result, when the vehicle is in the clutch disengaged condition, or in the initial condition of the clutch engaged condition, the engine speed is increased due to engine idling and the brake fluid pressure often tends to be released with the result that the vehicle is moving back without obtaining a sufficient starting torque. Also, there occurs a problem that when the clutch is in a completely engaged condition, the moving torque is increased too much to suddenly move the vehicle at the time when the engine speed reaches a predetermined value where the brake fluid pressure should be released.

In addition, the wear of the clutch causes the change in the clutch engaged position, thus imposing a problem that the release timing of the brake fluid pressure must be corrected in accordance with the change in the engaged position or disengaged position of the clutch.

SUMMARY OF THE INVENTION

It is an object of the present invention, therefore, to overcome the above drawbacks and to provide a booster unit for moving a vehicle on a slope and a method for controlling the same by recognizing the fact that the driving torque necessary for moving the vehicle is not necessarily in proportion to the engine speed.

It is another object of the present invention to provide a booster unit for moving a vehicle on a slope in which brake fluid pressure is released when actual driving torque reaches a predetermined driving torque in accordance with the vehicle conditions when moving and a smooth moving of the vehicle on a slope can be performed.

It is another object of the present invention to provide a booster unit for moving a vehicle on a slope in which the release timing for releasing the brake fluid pressure is carried out when a necessary driving torque is obtained and a smooth moving of the vehicle on a slope can be secured without backward moving or a sudden starting of the vehicle when moving.

It is yet another object of the present invention to provide a booster unit for moving a vehicle on a slope in which the release timing for releasing the brake fluid pressure is performed when the movement of a friction member from one side to the other side is detected by at least one switch provided at a brake unit when moving on a slope and a smooth moving of the vehicle on the slope can be realized.

It is still another object of the present invention to provide a method of controlling the booster unit so as to secure a smooth moving of a vehicle on a slope.

One of the features of the present invention resides in a booster unit for moving a vehicle on a slope, which comprises: a brake fluid pressure holding valve having an actuator and provided at a brake fluid pressure piping system for supplying brake fluid pressure from a master cylinder to wheel cylinders in proportion to the operated force of a brake pedal and for either maintaining or releasing the brake fluid pressure in accordance with the conditions of the vehicle on the slope; a plurality of input sensors for detecting the vehicle conditions; and a control unit including a microprocessor having a CPU, a RAM, and a ROM, for receiving each of the detected signals from the plurality of input sensors and for calculating and producing control signals to an actuator of the brake fluid pressure holding valve in accordance with the conditions of the vehicle on a slope and the driving torque conditions.

Another feature of the present invention resides in a method of controlling the booster unit, which comprises the steps of: maintaining brake fluid pressure in a vehicle stopped condition on a slope by producing a control signal for energizing an actuator of a brake fluid pressure holding valve from a control unit in accordance with detected signals for the vehicle conditions; and releasing the brake fluid pressure in a vehicle moving condition on a slope by producing a control signal for deenergizing the actuator from the control unit in accordance with the detected signals for the vehicle conditions; the releasing of the brake fluid pressure being carried out when actual driving torque reaches a predetermined driving torque.

These and other objects, features and advantages of the invention will be better understood from the following description with reference to the accompanying drawings.

DESCRIPTION OF THE PREFERRED EMBODIMENT

Figure 1:
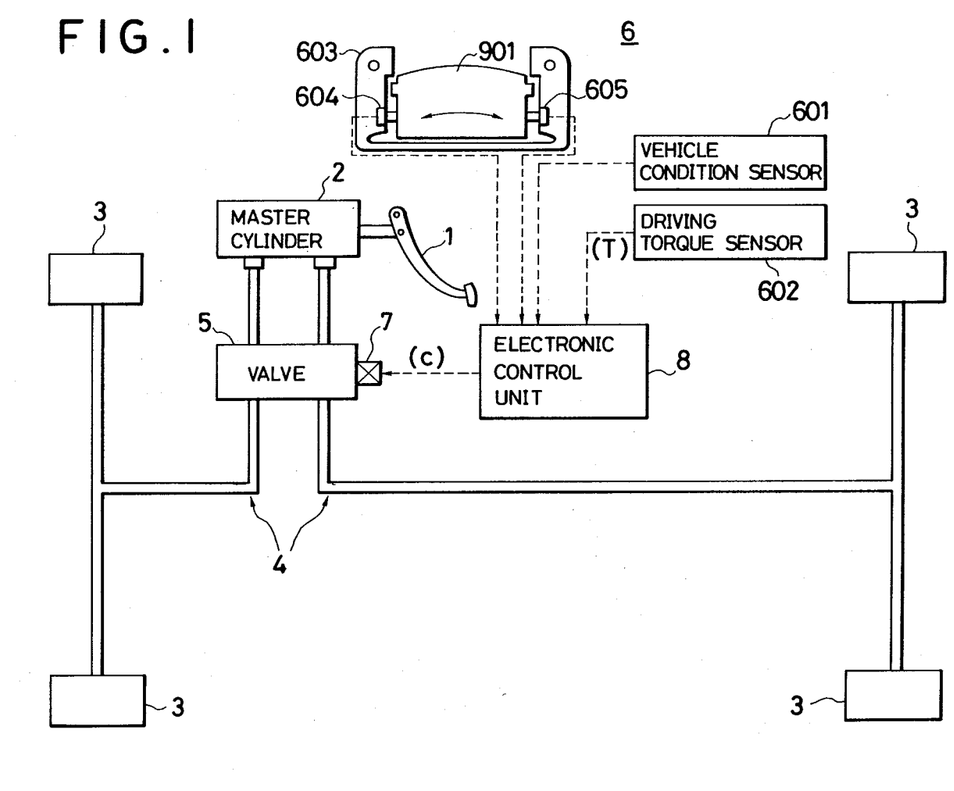
FIG. 1 illustrates a basic concept of the master cylinder for moving a vehicle on a slope according to the present invention.

FIG. 1 shows a block diagram of a general idea of the master cylinder for moving a vehicle on a slope, according to the present invention.

The booster unit of the invention comprises a brake pedal 1, a master cylinder 2, a wheel cylinders 3,3 a brake fluid pressure piping system 4, a brake fluid pressure holding valve 5 provided at the piping system 4 for supplying the brake fluid pressure from the master cylinder 2 to the wheel cylinders 3,3 in accordance with the operating conditions of the brake pedal, an input sensor 6 including a vehicle condition sensor 601 for detecting the vehicle status in the moving condition, a driving torque sensor 602 for detecting the driving torque from an engine through a clutch not shown, and a brake unit 603, a valve actuator 7, and an electronic control unit 8 for calculating and producing a control signal c which permits the brake fluid pressure to be maintained or released.

The sensor 6 also includes switches 604 and 605 for detecting the rotational direction displacement of a friction member 901 of a brake unit 603 and other sensors as will be described later.

In operation, the brake fluid pressure holding valve 5 maintains the brake fluid pressure even when the brake pedal 1 is released in the stopped condition on a slope while the brake fluid pressure is released when the vehicle is moving on the slope. The control unit 8 produces a release signal c to be applied to the actuator 7 so as to release the brake fluid pressure when signals representative of predetermined moving conditions are applied to the control unit 8 in accordance with the detected signals from the sensors. More particularly, the control unit 8 produces the release signals c when actual driving torque T from the driving torque sensor 602 reaches a target driving torque $T_0$.

The control unit 8 also produces the release signal c to be applied to the actuator 7 when signals representative of the position or the movement of the friction member 901 of the brake unit 603 are detected by the two switches 604 and 605 in another alternative embodiment.

Figure 2:
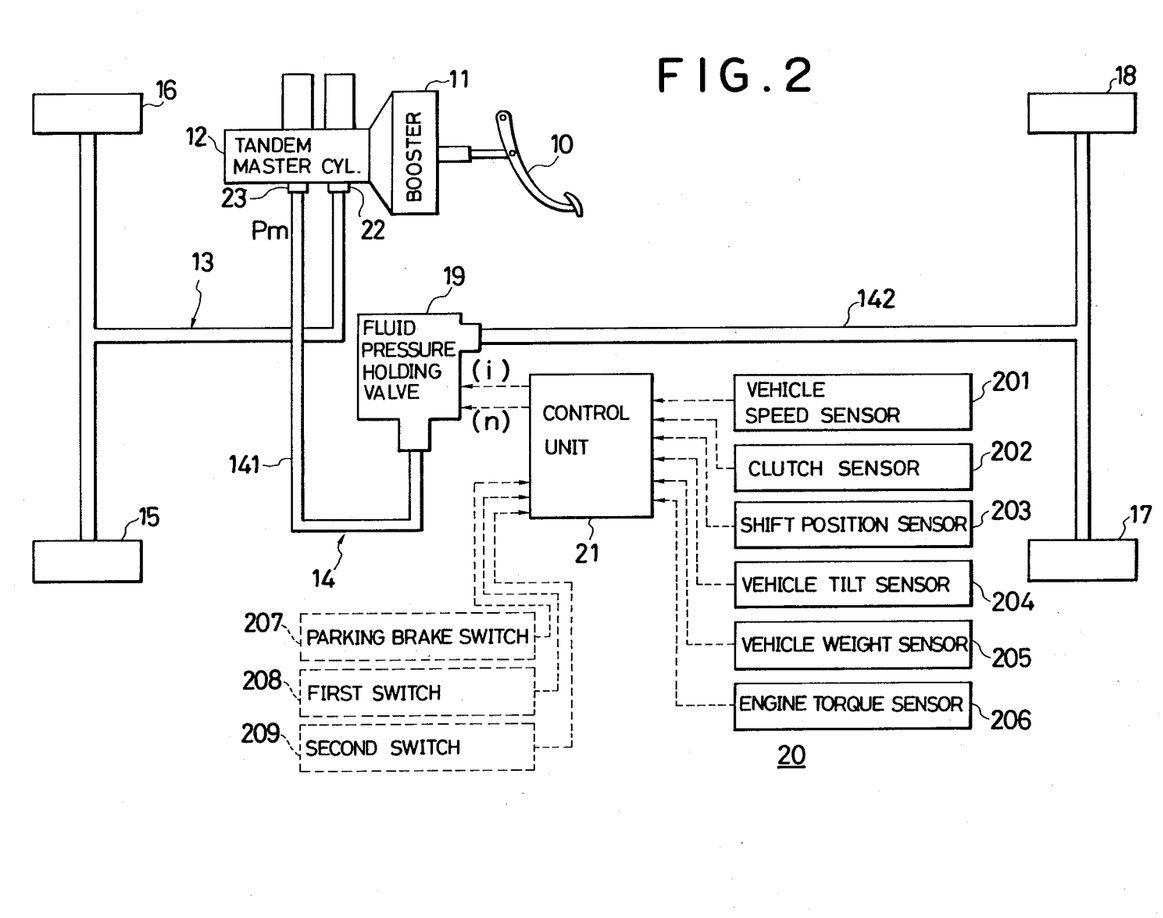
FIG. 2 illustrates each embodiment of the booster unit for moving a vehicle on a slope according to the present invention.

FIG. 2 shows one embodiment of the booster unit for moving a vehicle on a slope according to the present invention, which is used for vehicles having a large change in the vehicle weight due to the load thereof.

The booster unit comprises a brake pedal 10, a booster 11, a tandem master cylinder 12, a primary brake fluid pressure piping system 13, secondary brake fluid pressure piping system 14 front wheel cylinders 15, 16, rear wheel cylinders 17, 18, a brake fluid pressure holding valve 19, an input sensor 20, and an electonic control unit 21.

The brake pedal 10 is coupled to an operating rod of the booster 11 which is a power unit for increasing the brake operating force to the brake pedal 10 utilizing engine negative pressure. The booster brake operating force by the booster 11 is applied to primary and secondary pistons (not shown) of the tandem master cylinder 12 through a push rod.

The tandem master cylinder 12 is for converting the brake operating force from the booster 11 into brake fluid pressure. In the tandem master cylinder 12, there is formed two independent fluid pressure generating chambers corresponding to the primary and secondary pistons, respectively.

The primary brake fluid pressure piping system 13 supplies the brake fluid pressure from the primary fluid pressure port 22 of the tandem cylinder 12 to the front wheel cylinders 15 and 16.

The secondary brake pressure piping system 14 supplies the brake fluid pressure from the secondary fluid pressure port 23 of the tandem master cylinder 12 to the rear wheel cylinders 17 and 18 and in the middle of the brake fluid pressure piping system 14, there is provided the brake fluid pressure holding valve 19. The secondary brake fluid pressure piping system 14 consists of a master cylinder side brake pipe 141 and a wheel cylinder side brake pipe 142.

The front wheel cylinders 15 and 16 as well as the rear wheel cylinders 17 and 18 operate different brakes such as a drum brake, a disk brake, the braking force thereof is proportional to the magnitude of the brake fluid pressure, respectively.

The brake fluid pressure holding valve 19 is provided at the secondary brake liquid pressure piping system 14, which maintains the brake fluid pressure at that time during stopping on the ascending slope, even when the driver's foot is off of the brake pedal 10, while the brake fluid pressure is released when the vehicle is moving on the ascending slope. The brake fluid pressure holding valve 19 comprises, as shown in FIG. 3, a valve body 24, an input port 25, an output port 26, a plunger chamber 27, a ball chamber 28, a ball valve 29, a valve seat 30, a plunger 31, a plunger spring 32, and a solenoid 33 as a valve actuator.

In the brake fluid pressure holding valve 19, a valve portion is constructed by the ball valve 29 and valve seat 30. In the valve opening condition wherein the ball valve 29 is blocked from being seated on the valve seat 30 by a bias force of the plunger spring 32, the master cylinder fluid pressure $P_m$ is supplied to the rear wheel cylinders 17 and 18 as it is from the input port 25 through the plunger chamber 27, the ball chamber 28 and the output port 26.

Figure 3:
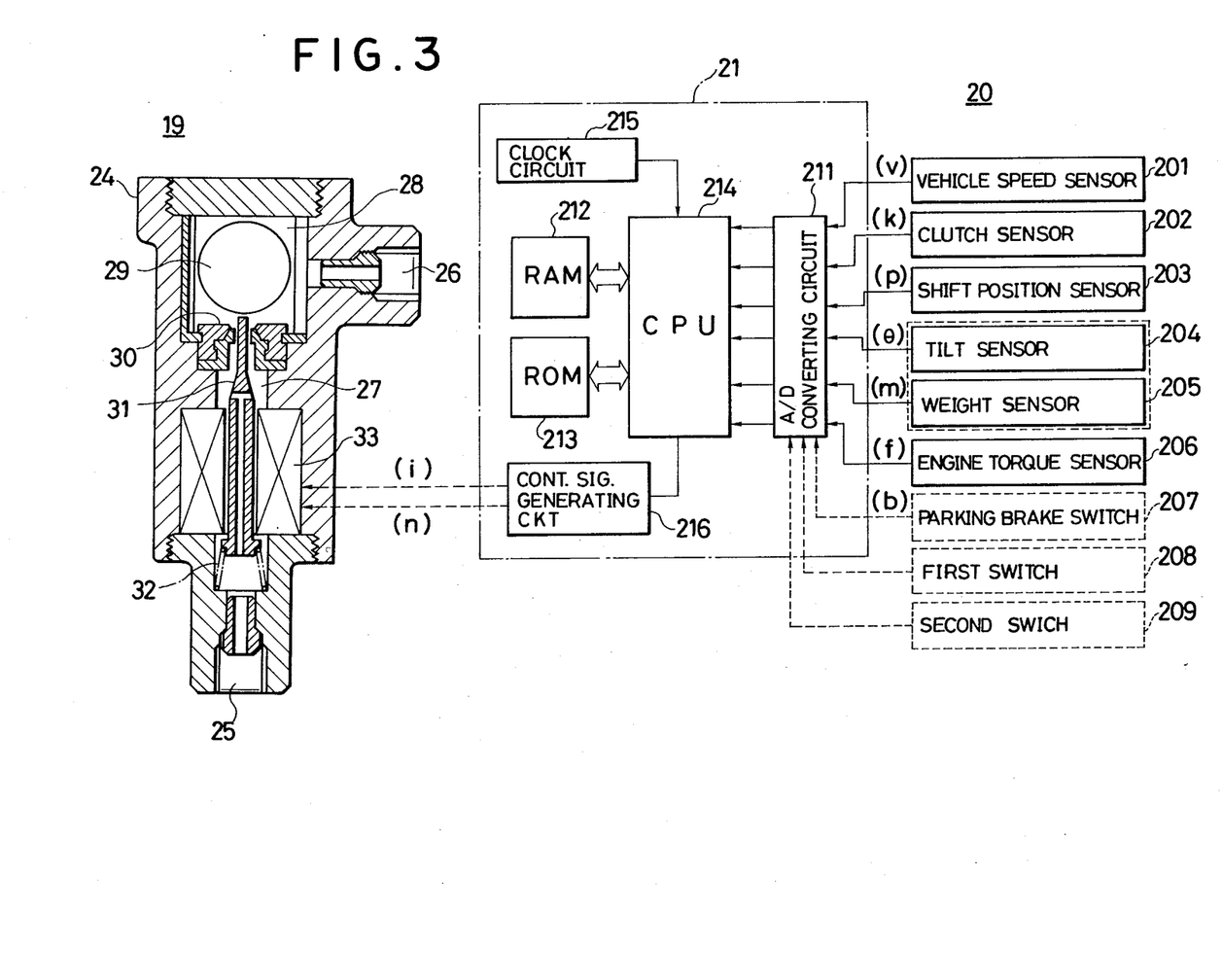
FIG. 3 illustrates a detailed construction of the booster unit having an electronic control unit and a brake fluid pressure holding valve as one embodiment according to the present invention.

When a control signal (i) is produced from the control unit 21 to the solenoid 33, the plunger 31 is moved downwards in FIG. 3 against the plunger spring 32. As a result, the ball valve 29 now seats on the valve seat 30, thus rendering a valve-closed condition. In this condition, the master cylinder liquid pressure $P_m$ is maintained in the wheel cylinder brake pipe 142 as well as the rear wheel cylinders 17 and 18.

The input sensor 20 includes a vehicle speed sensor 201, a clutch sensor 202, a shift position sensor 203, a vehicle tilt sensor 204, a vehicle weight sensor 205, and an engine torque sensor 206.

In addition, the input sensor 20 also includes a parking brake switch 207, a first switch 208, and a second switch 209 which are shown by a dotted line and which are used instead of the sensors 204 and 205, which will be described later as a third embodiment according to the present invention. The output signals from each of the sensors are applied to the control unit 21 so as to produce control signals to be applied to the solenoid as an actuator of the brake fluid pressure holding valve 19 and to either release the brake fluid pressure or maintain the brake fluid pressure.

The vehicle speed sensor 201 detects vehicle speed and produces a first electrical signal v which corresponds to the vehicle speed.

The clutch sensor 202 detects if the clutch is in the engaged or disengaged condition and produces a second electrical signal k in accordance with the clutch conditions.

The shift position sensor 203 detects the shift positions of a transmission (not shown) and produces a third electrical signal p corresponding to one of the shift positions.

The vehicle tilt sensor 204 detects the tilt of the vehicle when, for instance, the vehicle is running on a slope, and produces an output signal $\theta$ which corresponds to the vehicle tilt angle on a slope.

The vehicle weight sensor 205, which may be a stroke sensor for detecting the distance between upper and lower springs on a chassis, detects the vehicle weight and produces an output signal m which corresponds to the weight of the vehicle in question.

The engine torque sensor 206 detects the torque of a crankshaft of an engine and produces an output signal t corresponding to the driving torque thereof.

The parking brake switch 207 detects the conditions of the parking brake, if it is in the operated condition or in the non-operated condition, and produces an output signal b in accordance with the parking brake conditions, a detailed description of which will be made later.

As shown in FIG. 3, the control unit 21 comprises a A/D converting circuit 211, a microprocessor having a RAM (random access memory) 212, a ROM (read-only memory) 213, a CPU (central processing unit) 214, a clock circuit 215 and a control signal generating circuit 216.

As is well known, the A/D converting circuit 211 converts analog input signals from the input sensor 20 into digital signals which can be processed by the CPU 214. The RAM 212 temporarily stores the converted digital signals or data from the sensor 20 until the time comes for processing the data by the CPU 214 and also stores information necessary for processing in the course of operation. The ROM 213 preliminarily stores various control programs and data for CPU 214.

The CPU 214 reads information necessary for calculations and operations from the RAM 212 and the ROM 213, performs the processing of the information in accordance with an algorithm, and applies the result of the calculations and operations to the control signal generating circuit 216.

The clock circuit 215 produces clock signals for setting up the operations in the CPU 214. The control signal generating circuit 216 produces final control singals i and n in accordance with the result of the calculations from the CPU 214.

The control unit 21 applies the control signals (i) thus generated to the solenoid 33 of the brake fluid pressure holding valve 19 when a signal respresentative of a slope in the stopped condition of the vehicle is applied from any of the sensors 201 through 206. The control unit 21 also applies the release signal n thus generated for deenergization of the solenoid 33 of the valve 19.

Description of the first embodiment according to the present invention will now be made with reference to the control flow charts shown in FIGS. 5 and 6 associated with FIGS. 2 and 3.

Figure 5:
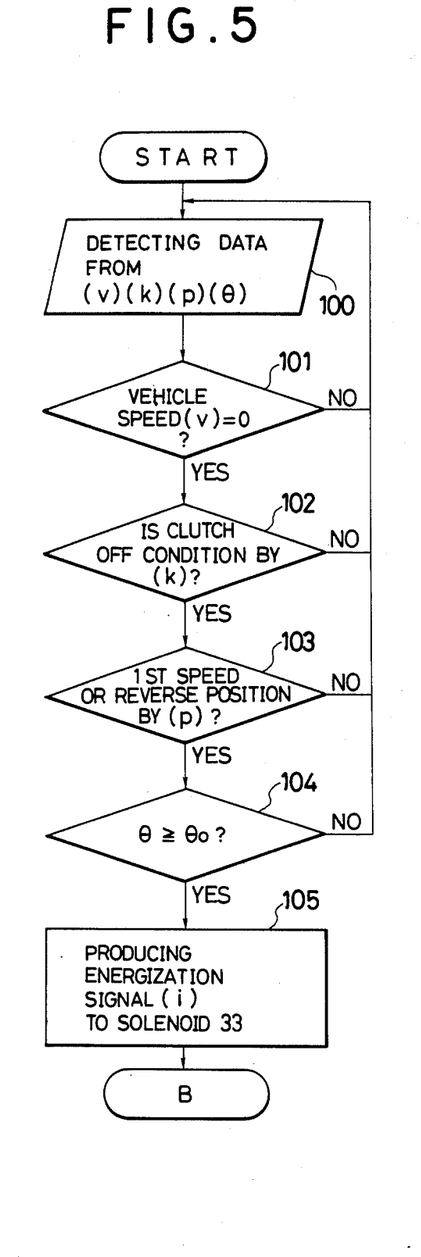
FIG. 5 is a control flow chart of the method of controlling the booster unit so as to maintain brake fluid pressure, according to one embodiment of the present invention.

(i) Fluid pressure holding control (see FIG. 5).

The timing control for holding the brake fluid pressure by the control unit 21 is performed in accordance with the following sequence;

After starting the control program, various data corresponding to the vehicle speed signal (v) from the vehicle sensor 201, the clutch signal (k) from the clutch sensor 202, the shift position signal (p) from the shift position sensor 203, and a vehicle tilt signal ($\theta$) from the vehicle tilt sensor 204 are detected and stored into the RAM 212 of the control unit 21 in step 100.

After this step, the operation goes to step 101 where a first determination is made if the actual vehicle speed (v) detected in step 100 is zero or not. If the result of the determination is NO, that is, the vehicle speed is not zero and it is in a running condition, the operation returns to the step 100. However, if the result of the determination is YES, that is the vehicle is in a stopped condition, the operation now goes to step 102.

In step 102, another decision is made if the clutch is in an engaged condition or in a disengaged condition in accordance with the clutch signal (k) detected in the step 100. If the result of the decision is YES, i.e. the clutch is in the disengaged condition, the operation moves to step 103. On the other hand, if the result of the decision is NO, i.e. the clutch is in the engaged condition, the operation returns to step 100.

In step 103, further decision is made if the shift position is a first speed position, a reverse position, or any position other than the former two positions. If the result of the decision is that the gear shift position is the first speed position or the reverse position, the operation now moves to the step 104. However, if the result of the decision is NO, that is the shift position is any position other than the two positions, the operation returns to the step 100.

In step 105, a decision is made if the actual vehicle tilt angle $\theta$ is equal to or larger than a predetermined vehicle tilt angle $\theta_0$ in accordance with the vehicle tilt signal $\theta$ detected in step 100. If the result of the decision is YES, that, the actual tilt angle 0 is above the predetermined tilt angle $\theta_0$ ($\theta \geq \theta_0$), the operation now moves to step 105. On the other hand, however, if the result of the decision is NO, i.e., $\theta < \theta_0$, the operation returns to step 100.

In step 105, an energization signal (i) is produced from the control unit 21 to the solenoid 33 of the brake fluid pressure holding valve 19 since it has turned out through the decision steps 101, 102, 103 and 104 that the vehicle is in the stopped condition on the slope and maintaining the brake fluid pressure is required in this case.

The generation of the energization signal (i) causes the plunger 31 of the brake fluid pressure holding valve 19 to move downwards against the plunger spring 32 by the magnetic force of the solenoid 33. As a result, the ball valve 29 is seated on the valve seat 30, thus maintaining the master cylinder fluid pressure $P_m$ from the tandem master cylinder 12. Afterward, the brake fluid pressure holding condition is maintained even when the brake pedal 10 is not operated by the driver. In this case, the energization signal (i) to the solenoid 33 is maintained unless a predetermined release requirement is satisfied in the following release timing control.

On the other hand, when it is desired to increase the brake fluid pressure, the brake pedal is again operated. Then, the master cylinder fluid pressure $P_m$ which is higher than the holding brake fluid pressure is sent. As a result, the ball valve 29 is temporarily separated from the valve seat 30, thus increasing the holding fluid pressure.

Figure 6:
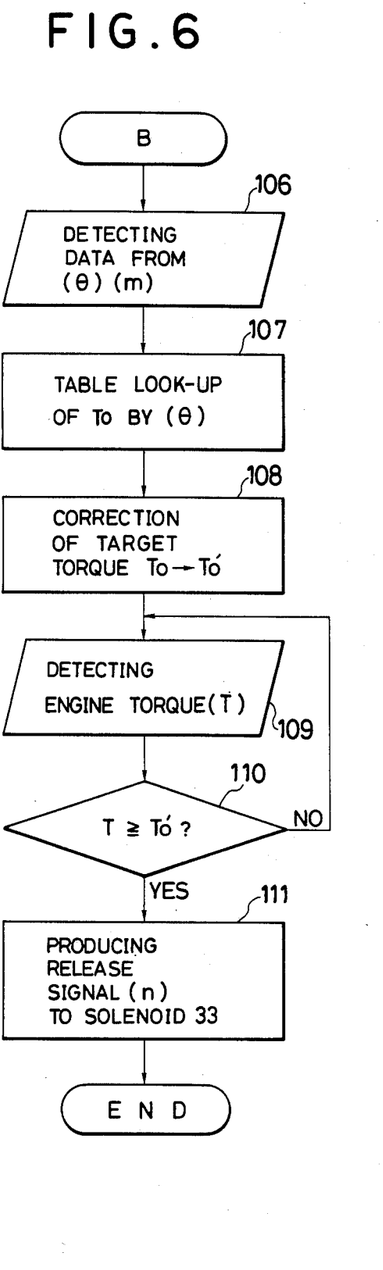
FIG. 6 is a control flow chart of the method of controlling the booster unit so as to release the brake fluid pressure, according to the present invention.

(ii) Release timing control (see FIG. 6)

The release timing control for releasing the brake fluid pressure by the control unit 21 is performed in the following manner.

In FIG. 6, in step 106 actual vehicle tilt angle and actual vehicle weight are detected by the vehicle tilt sensor 204 and by the vehicle weight sensor 205 and the corresponding vehicle tilt signal ($\theta$) and the vehicle weight signal (m) are produced and stored in the RAM 212 after converting them into the corresponding digital signals. After this operation, the operation now goes to step 107.

Figure 4:
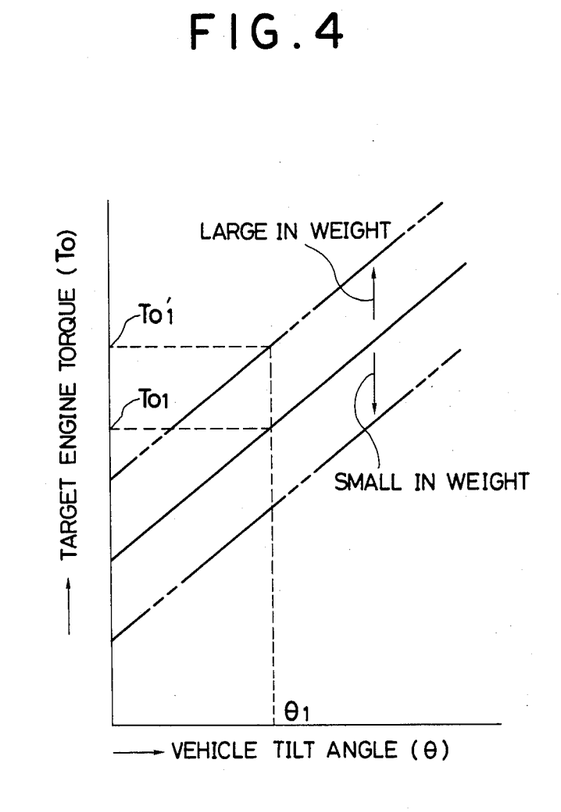
FIG. 4 is a graph showing a relationship between vehicle tilt angle and target engine torque, the data of which have preliminarily been stored in a ROM of a microprocessor in the control unit.

In step 107, a target engine torque $T_0$ is sought by a look-up table in accordance with the actual vehicle tilt angle ($\theta$) detected in step 106. As shown in FIG. 4, when the vehicle tilt angle is $\theta = \theta_1$, the target engine torque $T_0$ becomes $T_0 = T_{01}$. After this operation, it now moves to step 108.

In step 108, the target engine torque $T_0 = T_{01}$ thus sought by the table look-up operation is corrected by the vehicle weight signal (m) detected in step 106 and a final target engine torque $T_{01}'$ is set up by the correction. For instance, when the vehicle weight is large, the target engine torque $T_{01}$ now becomes $T_{01}'$ in accordance with the vehicle weight correction, as shown in FIG. 4. After this operation, it goes to step 109.

In step 109, the engine torque is detected by the engine torque sensor 206 as an engine torque signal (t) and stored in the RAM. After this operation, it now moves to step 110.

In step 110, the comparison of the target engine torque $T_0'$ calculated in the step 108 with the actual engine torque T (the engine torque signal t) is made. If the result of the comparison is No, that is, the actual engine torque T is below the target engine torque $T_0'$, the operation returns to step 109 and similar operations are repeated in the steps 109 and 110. On the other hand, however, if the result of the comparison is YES, that is, $T \geq T_0'$, the operation now moves to stpe 111.

In step 111, a release signal for energizing (n) is produced from the control unit 21 to the solenoid 33 of the brake fluid pressure holding valve 19.

The generation of the release signal (n) to the solenoid 33 causes the plunger 31 of the brake fluid pressure holding valve 19 to move upward in FIG. 3 by the bias force of the plunger spring 32. As a result, the ball valve 29 is pushed upward and then it is separated from the valve seat 30, thus releasing the fluid pressure towards the tandem master cylinder 12 and in turn releasing the brake fluid pressure.

As described in the foregoing first embodiment according to the present invention, when the actual engine torque T reaches the target engine torque $T_0'$ in accordance with the vehicle conditions during moving, the release of the brake fluid pressure is carried out. Accordingly, it follows that the release timing is made at the time point when an engine torque necessary for the moving of the vehicle has been obtained, thus realizing a smooth moving of the vehicle on the slope without backward moving of the vehicle due to the shortage of the torque during moving, as well as without a sudden moving of the vehicle due to an excessive torque.

Moreover, in the embodiment according to the present invention, since the target engine torque $T_0$ is set up continuously or steplessly in proportion to the vehicle tilt angle $\theta$, a smooth moving of the vehicle can be secured.

According to the present invention, since either holding or release of the brake fluid pressure is carried out when moving back, the invention can cope with various situations.

In addition, in the foregoing embodiment according to the present invention, since the final target engine torque $T_0'$ can be set up in consideration of the vehicle weight, it is applicable to various vehicles having a large change in a load carrying weight, such as trucks and the like.

Figure 7:
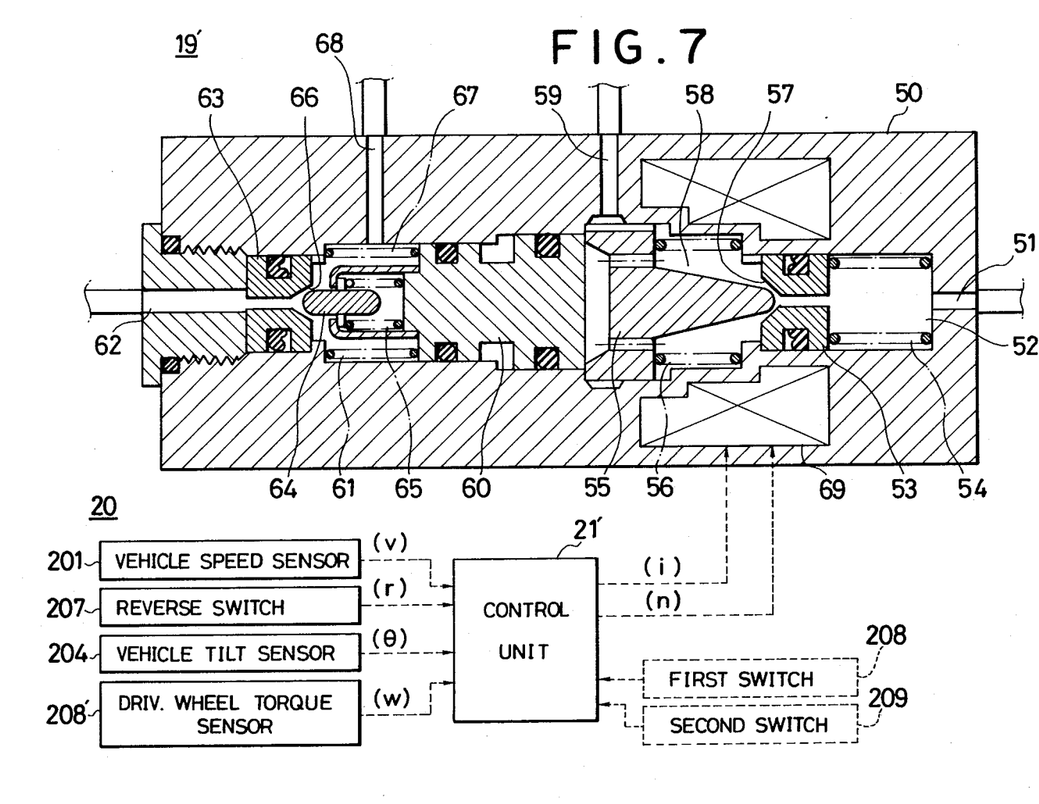
FIG. 7 is another embodiment of the brake fluid pressure holding valve of the booster unit according to the present invention.

FIG. 7 shows a second embodiment of the booster unit according to the present invention wherein another brake fluid pressure holding valve 19' is used for a two-system brake fluid pressure piping, and it also comprises a vehicle sensor 201, a reverse switch 207, a vehicle tilt sensor 204 and a driving wheel torque sensor 208 as the input sensor 20 in this case.

The brake fluid pressure holding valve 19' comprises a valve body 50, a first fluid pressure input port 51, a first input chamber 52, a first piston 53, a piston spring 54, a first valve 55, a first valve spring 56, a first valve seat 57, a first valve chamber 58, a first fluid pressure port 59, an angular piston 60, a piston spring 61, a second fluid pressure input port 62, a second piston 63, a second valve 64, a second valve spring 65, a second valve seat 66, a second valve chamber 67, a second fluid pressure output port 68, and a solenoid 69.

In this brake fluid pressure holding valve 19', the first fluid pressure input port 51 is connected to the primary fluid pressure port of the tandem master cylinder (not shown) while the second fluid pressure input port 62 is connected to the secondary fluid pressure port. In addition, the first fluid pressure output port 59 is connected to the left wheel front wheel cylinder and the right wheel rear wheel cylinder while the second fluid pressure output port 68 is connected both to the right wheel from wheel cylinder and left wheel rear wheel cylinder, which constitutes so-call "X piping system".

The timing control for maintaining the brake fluid pressure in this embodiment is carried out in the following manner.

The control unit 21 produces an energization signal (i) to the solenoid 69 when the vehicle speed signal (v) from the vehicle speed sensor 201 indicates zero speed and the switch signal (r) from the reverse switch 207 indicates a signal representative of the forward moving steps other than the reverse.

The release timing control is carries out in such a manner that the target driving wheel torque $T_0$ proportional to the vehicle tilt angle $\theta$ is calculated by a look-up table in accordance with the actual vehicle tilt signal θ from the vehicle tilt sensor 204. When the actual driving wheel torque T detected by the driving wheel torque sensor 208 reaches the target driving wheel torque $T_0$, the control unit 21 produces the release signal (n) and it is applied to the solenoid 69 of the valve 19', so as to release the brake fluid pressure. In this case, the brake fluid pressure holding valve 19' is operated similarly in the case of the first embodiment according to the present invention by performing the ON and OFF operations of the two valves.

In the foregoing embodiments according to the present invention, the description has been made that the vehicle tilt sensor and vehicle weight sensor are used as vehicle status sensors. However, it is apparent that any other sensors other than those which can detect the vehicle status during moving may be used, e.g., a road surface friction index sensor.

In addition, in the foregoing embodiments engine torque sensor and drive wheel sensor are used as a drive torque sensor. It is also apparent that it is not limited to those shown above. Various sensors may be used for detecting the torque in a power train system from the engine to the drive wheels, such as for detecting the driving torque indirectly by detecting both the engine speed and the clutch engagement or disengagement condition.

As described in the foregoing embodiments according to the present invention, the booster unit is constructed in such a manner that the brake fluid pressure is released when actual driving torque reaches a target driving torque in accordance with the vehicle conditions during moving, the release of the brake fluid pressure is performed at the time point when the driving torque necessary for moving has been obtained, thus realizing a smooth moving of the vehicle on a slope.

FIGS. 8 to 11 show a third embodiment of the booster unit and its control method according to the present invention. The first and second switches 208 and 209 shown in the figures correspond to the switches shown by the dotted line in FIGS. 2 and 3 and they are used instead of the vehicle tilt and weight sensors 204 and 205.

Figure 8:
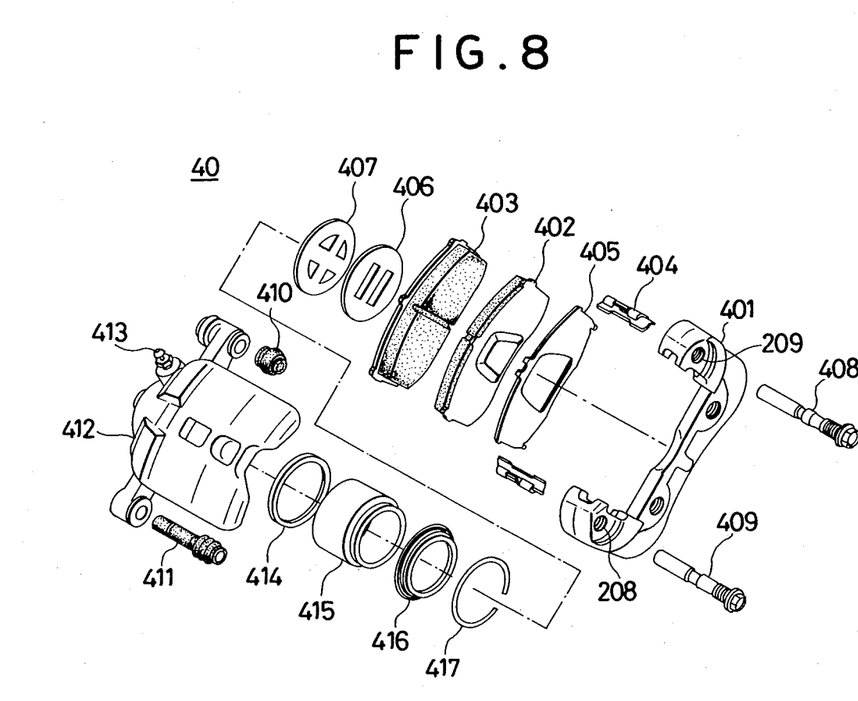
FIG. 8 illustrates each element of a disassembled disk brake including first and second switches for use in the present invention.

In this embodiment, it utilizes the movement of the friction member from one side to the other side when the vehicle in question is running on a slope and the operation of the switches 208 and 209 as the result of the movement.

In FIG. 8, a disk brake 40 in this embodiment is of a single piston floating caliper type and it comprises a torque member 401 an outer pad 402, an inner pad 403, a pad spring 404, an outer shim 405 an inner shim 406, a piston cover shim 407, a lock pin 408, a guide pin 409, a lock pin boots 410, a guide pin boots 411, a cylinder body 412, an air bleeder 413, a piston seal 414, a piston 415, a dust cover 416, a retainer ring 417.

Figure 9:
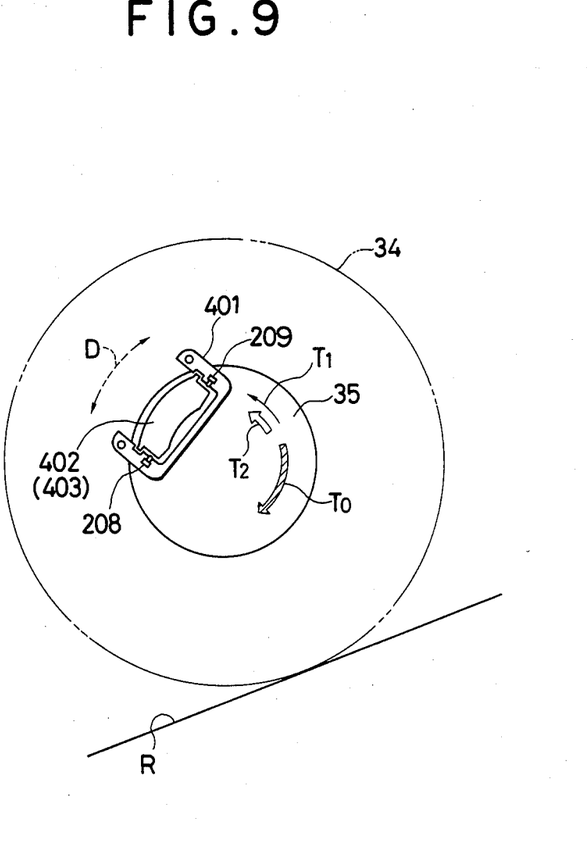
FIG. 9 illustrates a wheel of the vehicle and its associated elements in the stopped condition on a slope for explaining the operation of the booster unit according to the invention.

The two switches 208 and 209 are operated ON and OFF by the movement of the outer pad 402 and the inner pad 403 from the neutral position against the torque member 401 on the vehicle body side, which are contacted with a disk rotor 35 on the wheel side 34 when the brake is operated on a slope R as shown in FIG. 9. In operation, when the pad 402 (or 403) is moved, one of the switches 208 and 209 is operated and an ON signal is produced from one of the switches in accordance with the direction of the tilt of the vehicle. In the neutral position of the outer pad 402 (or inner pad 403), however, no ON signal is produced from both the switches 208 and 209.

The operation of the booster unit according to this embodiment will now be described with reference to the control flow chart shown in FIGS. 10 and 11 in conjunction with FIGS. 2 and 3.

Figure 10:
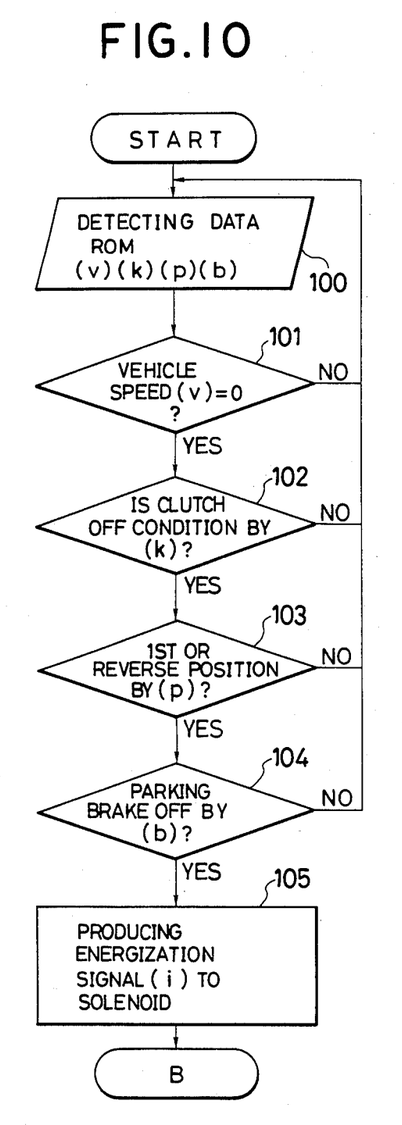
FIG. 10 is a control flow chart of another embodiment of the method of controlling the booster unit so as to maintain the brake fluid pressure.

(i) Brake fluid pressure holding control (see FIG. 10)

After starting the control program, various data corresponding to the vehicle speed signal V from the vehicle sensor 201, the clutch signal k from the clutch sensor 202, the shift position signal p from the shift position sensor 203, and the parking brake signal b from the parking brake sensor 207 are detected and stored into the RAM 212 of the control unit 21 in step 100.

After the excusion of the above step, the operation now goes to step 101 where a first determination is made if the actual vehicle speed v detected in step 100 is zero or not. If the result of the determination is NO, that is, the vehicle speed is not zero speed and it is in a running condition the operation returns to the step 100. However, if the result of the determination is YES, that is, the vehicle is in the stopped condition, the operation now goes to step 102.

In step 102, another decision is made if the clutch is in the engaged condition or in the disengaged condition in accordance with the clutch signal k detected in the step 100. If the result of the decision is YES, that is, the clutch is in the disengaged condition, the operation moves to step 103. On the other hand, if the result of the decision is NO, i.e. the clutch is in the engaged condition, the operation returns to step 100.

In step 103, further decision is made if the shift position is the first speed position, or the reverse position, the operation now goes to step 104. However, if the result of the decision is NO, that is, the shift position is any position other than the two positions, the operation returns to the step 100.

In step 104, a decision is made if the parking brake is operated or not operated in accordance with the parking brake signal b detected in step 100. If the result of the decision is YES, i.e. the parking brake is not operated, the operation goes to step 105. On the other hand, however, if the result of the decision is NO, the operation returns to step 100.

In step 105, an energization signal i is produced from the control unit 21 to the solenoid 33 of the brake fluid pressure holding valve 19 since it has turned out that through the decision steps 101, 102, 103, and 104 that the vehicle is in the stopped condition on the slope and maintaining the brake fluid pressure is required in this case.

The generation of the energization signal i causes the plunger 31 of the brake fluid pressure holding valve 19 to move downwards against the plunger spring 32 by the magnetic force of the solenoid 33. As a result, the ball valve 29 is seated on the valve seat 30, thus maintaining the master cylinder fluid pressure $P_m$ from the tandem master cylinder 12. Afterward, the fluid pressure holding condition is maintained even when the brake pedal 10 is not operated by the driver. In this case, the energizing signal i to the solenoid 33 is maintained unless a predetermined release requirement is satisfied in the following release timing control.

On the other hand, when it is desired to increase the holding pressure of the brake fluid pressure, the brake pedal 10 is again operated. Then, the master cylinder fluid pressure $P_m$ which is higher than the brake fluid pressure is sent. As a result, the ball valve 29 is temporarily separated from the valve seat 30, thus increasing the brake fluid pressure.

Figure 11:
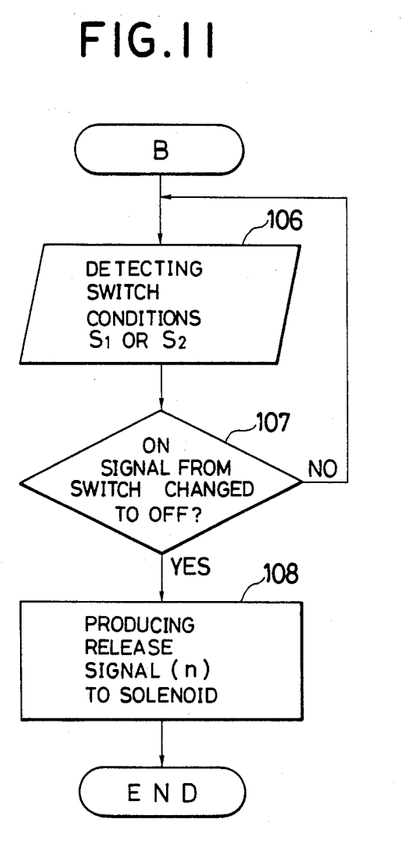
FIG. 11 is a control flow chart of another embodiment of the method of controlling the booster unit so as to release the brake fluid pressure, according to the present invention.

(ii) Release timing control (see FIG. 11)

The release timing control for releasing the brake fluid pressure by the control unit 21 is performed in the following manner.

In FIG. 11, in step 106, the output ON signal from either the first switch 208 or the second switch 209 is detected by the control unit 21 and it is stored into the RAM 212. After this operation, the operation goes to step 107, where a determination is made if either the ON signal $S_1$ or $S_2$ detected in step 106 has been changed from ON to OFF signal.

If the result of the determination is NO, that is, no change has happened and one of the ON signals $S_1$ and $S_2$ remains, the operation returns to step 106. On the other hand, however, if the result of the determination in step 107 is YES, the operation now goes to step 108, where the release signal n for the solenoid 33 of the brake fluid pressure holding valve 19 is produced from the control unit 21.

The generation of the release signal n to the solenoid 33 causes the plunger 31 of the brake fluid pressure holding valve 19 to move upward in FIG. 4 by the bias force of the plunger spring 32. As a result, the ball valve 29 is pushed upward and then it is separated from the valve seat 30, thus releasing the brake fluid pressure.

In the above embodiment according to the present invention, when the driving torque $T_0$ applied to the wheel 34 during moving of the vehicle on a slope is balanced with the sum torque of the braking torque $T_1$ and the reverse or backward torque $T_2$ due to the inclined road surface R, the outer pad 402 (or the inner pad 403) begins moving in the direction of the driving torque $T_0$ with the rotation of the disk rotor 35.

When the outer pad (or the inner pad 403) is in the neutral position, a signal representative of the neutral position, i.e. a signal changing from the ON to OFF condition is produced from either the first switch 208 or the second switch 209 provided at the torque member 401, the release of the brake fluid pressure is carried out. As a result, the release of the brake fluid pressure is performed at the time point when the engine torque necessary for the moving has been obtained, thus realizing a smooth moving of the vehicle on a slope, without the reverse moving of the vehicle due to the shortage of the torque when moving, or without a sudden moving of the vehicle due to an excessive torque.

Moreover, according to the present invention, since the release timing control is performed by detecting the driving torque $T_0$, the braking torque $T_1$ and the backward torque $T_2$ in the disk brake 40 of the wheel 34, the release timing of the brake fluid pressure can be set up in accordance with factors affecting the moving torque when moving on a slope, such as slope inclination angle or tilt angle, road surface friction index, or vehicle weight. Namely, the timing control for releasing the brake fluid pressure can be carried out by the first and second switches 208 and 209 provided at the disk brake 40 as shown in FIG. 8, instead of the various sensors including the driving torque sensor, the braking torque sensor and the sensor for detecting the road surface conditions and vehicle conditions described above, but having almost the same functions as those of the sensors. As a result, the contruction of the sensors can be simplified and becomes economical.

In addition, in the foregoing embodiment, since either the first switch 208 or the second switch 209 is operated depending upon the ascending slope or a descending slope and the corresponding ON signal is produced by one of the switches, either the maintaining or the release of the brake fluid pressure can also be performed. As a result, the moving back of the vehicle on descending slope can also be possible.

The booster unit having the brake fluid pressure holding valve 19' shown in FIG. 7 can also be controlled by the first and second switches 208 and 209.

In this embodiment, a relief valve is formed by the first piston 53 and the piston spring 54 and the operation of the fluid pressure holding valve 19' is same as that of the previous embodiment shown in FIG. 7 (solid line), except that the maximum pressure of the liquid pressure is limited, by the ON and OFF operation of the two valves.

In the last embodiment, the description has been made about the provision of the first and second switches at the torque member of the disk brake. However, it may also be possible to provide the two switches on the rear portion of the brake pad.

Moreover, in the last embodiment, two switches including the first and second switch are provided. However, it is also possible to provide only the first switch 205 and to utilize the change in the ON or OFF condition of the first switch 205. Namely, when the driving torque surpasses the load torque and the first switch 205 is changed from the ON condition to the OFF condition on the ascending slope, the brake fluid pressure may be released. Alternatively, it also be possible to release the liquid pressure when the first switch 205 is changed from OFF condition to the ON condition on the descending slope.

It is also similarly possible to utilize only the second switch 209. In this case, however, it is to be noted that the operation of the second switch 209 becomes opposite to that of the first switch 208.

In the last embodiment, the description has been also made that a switch or switches is mounted to the disk brake. It is also be possible that a switch capable of detecting rotational directions may be uses in a drum brake, instead of the disk brake.

As described in the last embodiment according to the present invention, the booster unit for moving a vehicle on a slope is constructed in such a manner that when the movement of a friction member from one position to other position is detected by a switch or switches provided on a brake unit the brake fluid pressure is released. As a result, the release timing for the brake fluid pressure can be performed at the time point when a driving torque necessary for moving the vehicle has been obtained, thus securing a smooth moving of the vehicle on a slope.

According to the present invention, in as much as the booster unit is simple in construction, various timing control for releasing the brake liquid pressure can be obtained in accordance with different road surface conditions as well as the vehicle conditions.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A brake system in which brake fluid pressure is supplied from a master cylinder to wheel cylinders in proportion to the operated force of a brake pedal, comprising:

(a) brake fluid pressure valve means provided between the master cylinder and the wheel cylinders for either maintaining or releasing the fluid pressure;
(b) vehicle tilt sensor means for detecting a vehicle tilt condition;
(c) engine torque sensor means for detecting actual engine torque;
(d) sensor means for detecting a vehicle moving or stopped condition on a slope;
(e) control means for controlling said brake fluid pressure valve means in such a manner that when the actual engine torque reaches a predetermined driving torque necessary for moving the vehicle in the vehicle moving and tilt condition on the slope the brake fluid pressure is released, and the brake fluid pressure is maintained in the vehicle stopped and tilt condition on the slope, thereby securing a smooth moving of the vehicle on a slope and preventing back moving of the vehicle on the slope;
said vehicle moving or stopped condition sensor means comprises a vehicle weight sensor, a vehicle speed sensor, a clutch sensor, and a shift position sensor; and
wherein said engine torque sensor means comprises a two switch device provided at a torque member of a disk brake for detecting a predetermined rotational direction displacement of the torque member to detect that the predetermined driving torque necessary for moving the vehicle is obtained.

2. The brake system as claimed in claim 1, in which said vehicle moving or stopped condition sensor means further comprises a parking brake switch for detecting the parking brake operated conditions.

3. A brake system as recited in claim 1, wherein said vehicle tilt sensor means detects whether the vehicle is stopped in an upwardly slanted state or a downwardly slanted state and comprises means for determining a contact force between a torque member (401) and an outer pad (402) of a vehicle brake, and said control valve is operative to release said fluid brake pressure at the starting time of the vehicle when the outer pad (402) does not contact the torque member (401).

4. A brake system in which brake fluid pressure is supplied from a master cylinder to wheel cylinders in proportion to the operated force of a brake pedal, comprising:
(a) brake fluid pressure valve means provided between the master cylinder and the wheel cylinders for either maintaining or releasing the fluid pressure;
(b) vehicle tilt sensor means for detecting a vehicle tilt condition;
(c) engine torque sensor means for detecting actual engine torque;
(d) sensor means for detecting a vehicle moving or stopped condition on a slope;
(e) control means for controlling said brake fluid pressure valve means in such a manner than when the actual engine torque reaches a predetermined driving torque necessary for moving the vehicle in the vehicle moving and tilt condition on the slope the brake fluid pressure is released, and the brake fluid pressure is maintained in the vehicle stopped and tilt condition on the slope, thereby securing a smooth moving of the vehicle on the slope and preventing back moving of the vehicle on the slope; and
wherein said brake fluid pressure valve means comprises a valve body, an input port, an output port, a plunger chamber, a ball chamber, a ball valve, a valve seat, a plunger, a plunger spring and a solenoid as an actuator, whereby master cylinder fluid pressure is supplied to rear wheel cylinders in the valve opened condition.

5. A brake system as recited in claim 4, wherein said vehicle tilt sensor means detects whether the vehicle is stopped in an upwardly slanted state or a downwardly slanted state and comprises means for determining a contact force between a torque member (401) and an outer pad (402) of a vehicle brake, and said control valve is operative to release said fluid brake pressure at the starting time of the vehicle when the outer pad (402) does not contact the torque member (401).

6. A brake system in which brake fluid pressure is supplied from a master cylinder to wheel cylinders in proportion to the operated force of a brake pedal, comprising:
(a) brake fluid pressure valve means provided between the master cylinder and the wheel cylinders for either maintaining or releasing the fluid pressure;
(b) vehicle tilt sensor means for detecting a vehicle tilt condition;
(c) engine torque sensor means for detecting actual engine torque;
(d) sensor means for detecting a vehicle moving or stopped condition on a slope;
(e) control means for controlling said brake fluid pressure valve means in such a manner that when the actual engine torque reaches a predetermined driving torque necessary for moving the vehicle in the vehicle moving and tilt condition on the slope the brake fluid pressure is released, and the brake fluid pressure is maintained in the vehicle stopped and tilt condition on the slope, thereby securing a smooth moving of the vehicle on the slope and preventing back moving of the vehicle on the slope; and
wherein said brake fluid pressure valve means have first and second valve members in a two brake fluid pressure piping system, with a first fluid pressure output port connected both to a left side front wheel cylinder and a right side rear wheel cylinder while a second fluid pressure output port is connected both to a right side front wheel cylinder and a left side rear wheel cylinder.

7. A brake system as recited in claim 6, wherein said vehicle tilt sensor means detects whether the vehicle is stopped in an upwardly slanted state or a downwardly slanted state and comprises means for determining a contact force between a torque member (401) and an outer pad (402) of a vehicle brake, and said control valve is operative to release said fluid brake pressure at the starting time of the vehicle when the outer pad (402) does not contact the torque member (401).

8. A method of controlling a brake system, which comprises the steps of:
(1) maintaining the brake fluid pressure in a vehicle stopped and tilt condition on a slope by producing a first control signal for energizing an actuator of a brake fluid pressure holding valve in accordance with detected signals of vehicle conditions,
(2) releasing the brake fluid pressure in the vehicle moving and tilt conditions on a slope by producing a second control signal for deenergizing said actuator in accordance with the detected signals of vehicle conditions, (3) the releasing of the brake fluid pressure being carried out when actual driving torque reaches a predetermined driving torque necessary for moving the vehicle in the vehicle moving and tilt condition on the slope, and wherein the step of maintaining the brake fluid pressure further comprises the steps of:

(a) detecting vehicle speed, clutch conditions, shift positions of a transmission, a vehicle tilt, and a parking brake switch conditions and storing the corresponding data into a memory (RAM);

(b) determining if the vehicle speed is zero from the vehicle speed thus detected and stored;

(c) determining if the clutch is in a disengaged condition from the clutch conditions thus detected;

(d) determining if the shift position is in the reverse position, the first speed position or another position from the shift positions thus detected;

(e) determining if actual vehicle tilt thus detected is equal to or larger than a predetermined vehicle tilt from the tilt signal thus detected; and (f) producing said first control signal to be applied to said actuator or said brake fluid pressure holding valve for maintaining the brake fluid pressure when the actual vehicle tilt angle is equal to or larger than the predetermined vehicle tilt angle.

9. The method of controlling a brake system as claimed in claim 8 wherein the method further comprises the step of: determining if the parking brake is in the operated condition or in the non-operated condition from the parking brake switch conditions thus detected, instead of determining if the actual vehicle tilt angle is equal to or larger than the predetermined vehicle tilt angle in accordance with the result of the third determination; and producing the energization signal to be applied to the actuator of the brake fluid pressure holding valve from the control unit for maintaining the brake fluid pressure in accordance with the result of the forth determination, when the parking brake is in the non-operated condition.

10. A method of controlling a brake system, which comprises the steps of:

(1) maintaining the brake fluid pressure in a vehicle stopped and tilt condition on a slope by producing a first control signal for energizing an actuator of a brake fluid pressure holding valve in accordance with detected signals of vehicle conditions, (2) releasing the brake fluid pressure in the vehicle moving and tilt conditions on a slope by producing a second control signal for deenergizing said actuator in accordance with the detected signals of vehicle conditions, (3) the releasing of the brake fluid pressure being carried out when actual driving torque reaches a predetermined driving torque necessary for moving the vehicle in the vehicle moving and tilt condition on the slope, and wherein the step of releasing the brake fluid pressure further comprises the steps of:

(a) detecting a vehicle tilt angle and a vehicle weight by a vehicle tilt sensor and a vehicle weight sensor, respectively, and storing the corresponding data into a RAM of a microprocessor;

(b) performing a table look-up operation and obtaining a target engine torque ($T_0$) from actual tilt angle ($\theta$) thus detected;

(c) correcting the target engine torque thus obtained in accordance with the vehicle weight conditions thus detected;

(d) detecting actual engine torque by an engine torque sensor;

(e) comparing actual engine torque deteced by an engine torque sensor with the target engine torque thus corrected; and (f) producing said second control signal to be applied to said actuator of said brake fluid pressure holding valve for releasing the brake fluid pressure in accordance with the result of the comparison, when the actual engine torque is equal to or larger than the corrected target engine torque.

11. A method of controlling a brake system, which comprises the steps of:

(1) maintaining the brake fluid pressure in a vehicle stopped and tilt condition on a slope by producing a first control signal for energizing an actuator of a brake fluid pressure holding valve in accordance with detected signals of vehicle conditions, (2) releasing the brake fluid pressure in the vehicle moving and tilt conditions on a slope by producing a second control signal for deenergizing said actuator in accordance with the detected signals of vehicle conditions, (3) the releasing of the brake fluid pressure being carried out when actual driving torque reaches a predetermined driving torque necessary for moving the vehicle in the vehicle moving and tilt condition on the slope, and wherein the step of releasing the brake fluid pressure further comprises the steps of:

(a) detecting at least the switching conditions of at least one switch provided at a torque member of a brake, which is turned on and off in accordance with the road conditions, corresponding to a generally flat road, an ascending slope, or a descending slope;

(b) determining if the signal representative of the switch conditions has been changed from one condition to the other condition; and (c) producing said second control signal for deenergizing the actuator of said brake fluid pressure holding valve for releasing the brake fluid pressure in accordance with the result of the determination.

12. The method of controlling a brake system as claimed in claim 11 wherein the step of determining if any signal representative of the switch conditions has been changed includes determining whether the switch condition has changed from an ON to an OFF condition.

13. A brake system for a vehicle comprising:

(a) piping means for supplying a brake fluid pressure in response to a force applied to a brake pedal from a master cylinder to wheel cylinders;

(b) valve means for maintaining the brake fluid pressure when no force is applied to the brake pedal in a slanting state of the vehicle with respect to horizontal, and releasing the brake fluid pressure applied to the wheel cylinder when the vehicle is started in said slanting state;

(c) actuator means for actuating the valve means;

(d) a frictional member disposed in a brake device for braking the vehicle and rotated in accordance with a drive torque applied from an engine to the wheels;

(e) switch means for detecting the rotational displacement of a frictional member with respect to a predetermined rotational position of the frictional member and providing a signal in response thereto; and (f) control means responsive to said signal from said switch means for outputting a release signal for releasing the maintaining of the brake fluid pressure to said actuator means.

14. A brake system as claimed in claim 13, wherein said control means generates said release signal when an engine torque required to start the vehicle is provided.

15. A brake system as claimed in claim 13, wherein said control means generates said release signal when the frictional member is located in said predetermined rotational position which is a neutral position.

16. A method for controlling a brake system for a vehicle, said method comprising the steps of:

(a) supplying a brake fluid pressure in response to a force applied to a brake pedal from a master cylinder to wheel cylinders;

(b) holding the brake fluid pressure when no force is applied to the brake pedal in a slanting state of the vehicle with respect to horizontal;

(c) detecting a rotational displacement of a frictional member disposed in a brake device for braking the vehicle with respect to a predetermined rotational position of the frictional member, said frictional member being rotated in accordance with a drive torque applied to the wheels;

(d) outputting a release signal for releasing the holding of the brake fluid pressure to valve means for controlling the brake fluid pressure in a state in which the frictional member is moved from one position to the other position with respect to the rotational direction of the frictional member; and (e) releasing the holding of the brake fluid pressure applied to the brake pedal by the valve means when the vehicle is started in said slanting state.

17. A method as claimed in claim 16, wherein said holding of the brake fluid pressure is released when no engine torque required to start the vehicle is provided.

18. A method as claimed in claim 16, wherein said holding of the brake fluid pressure is released when the frictional member is located in said predetermined rotational position which is a neutral position.

* * * * *